Figure 1:
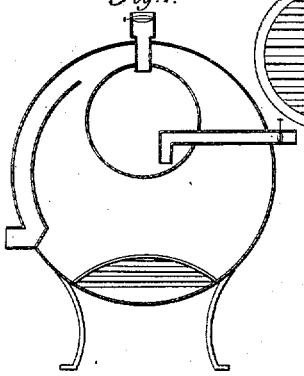
Figure 2:
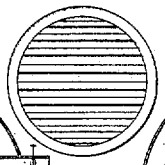
Figure 3:
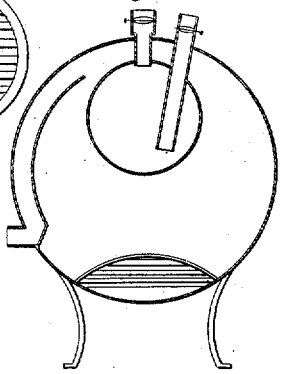
Figure 4:
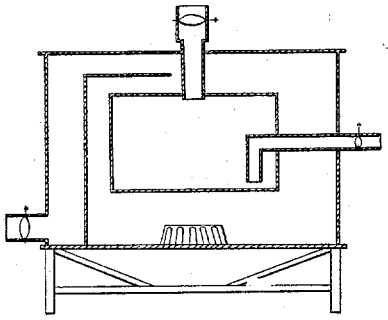
Figure 5:
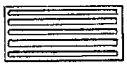
Figure 6:
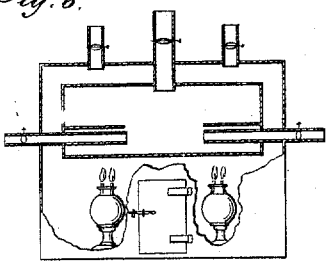
Figure 7:
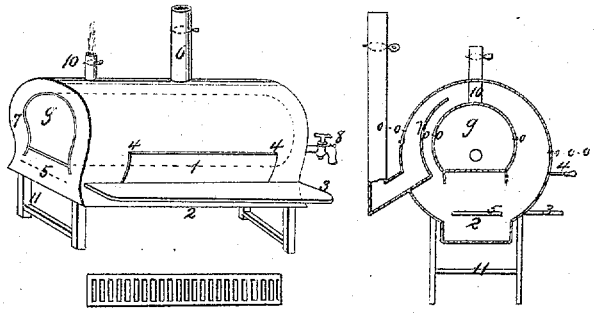
Figure 8:
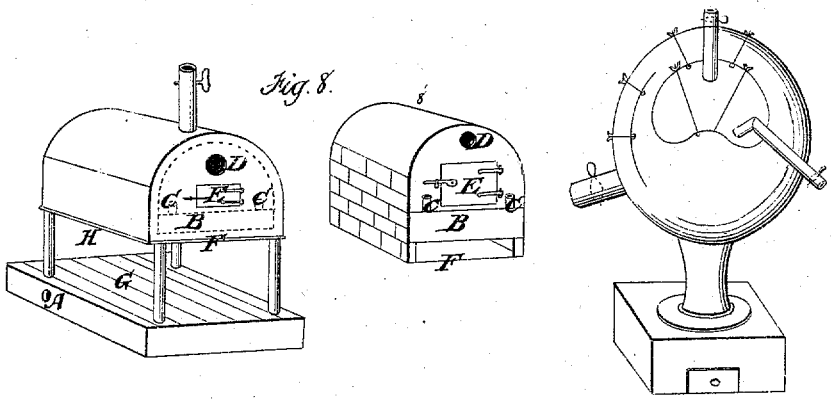
Figure 8:
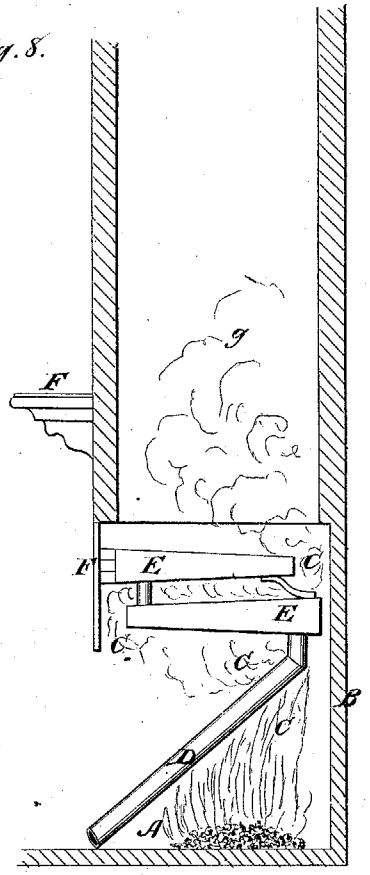
Figure 7:
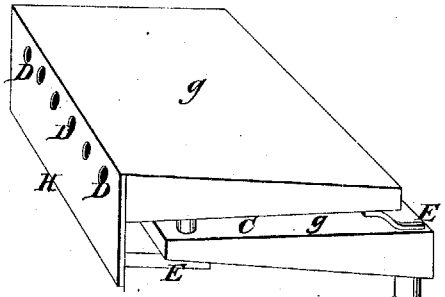
Figure 10:
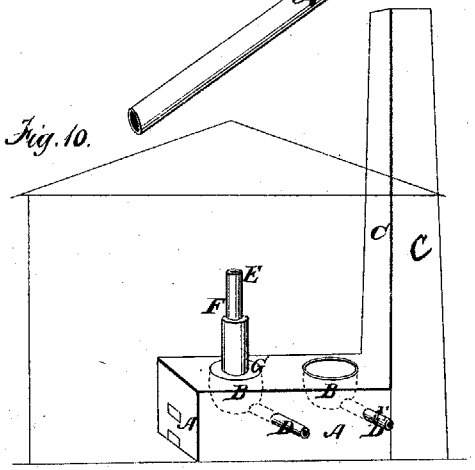

1731X

D. PETTIBONE.

RAREFIED AIR STOVE.

Patented May 12, 1812.

1731X
D. PETTIBONE.
RAREFIED AIR STOVE.
Patented May 12, 1812.
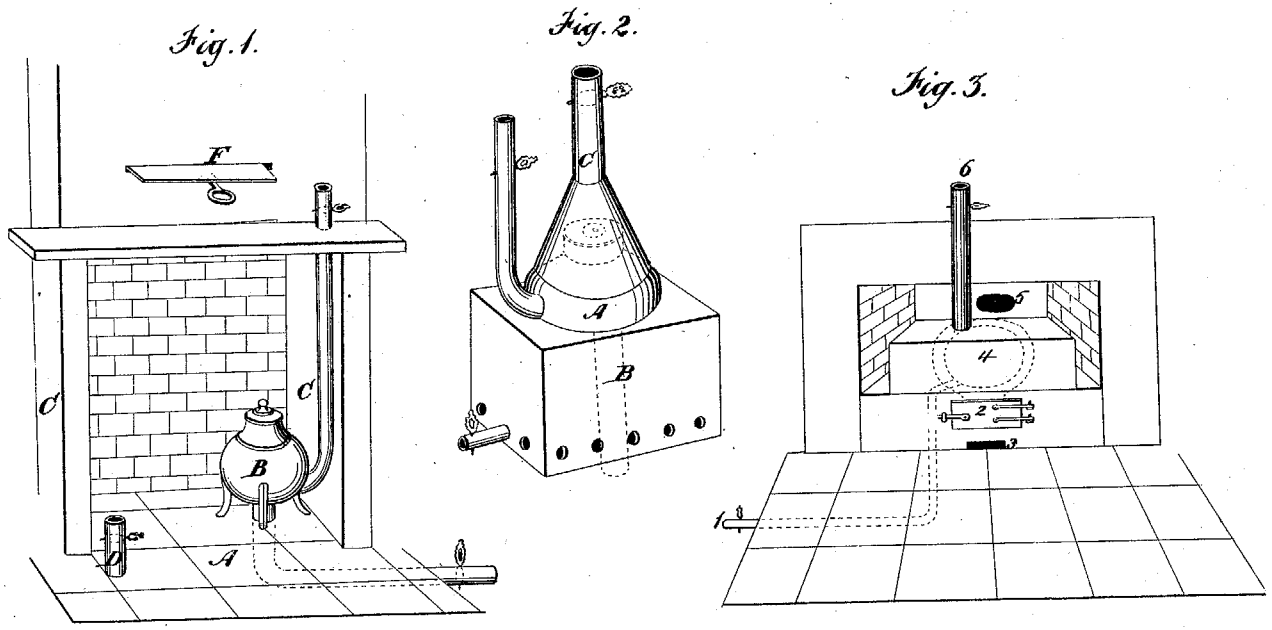

1731X
D. PETTIBONE.
RAREFIED AIR STOVE.
Patented May 12, 1812.
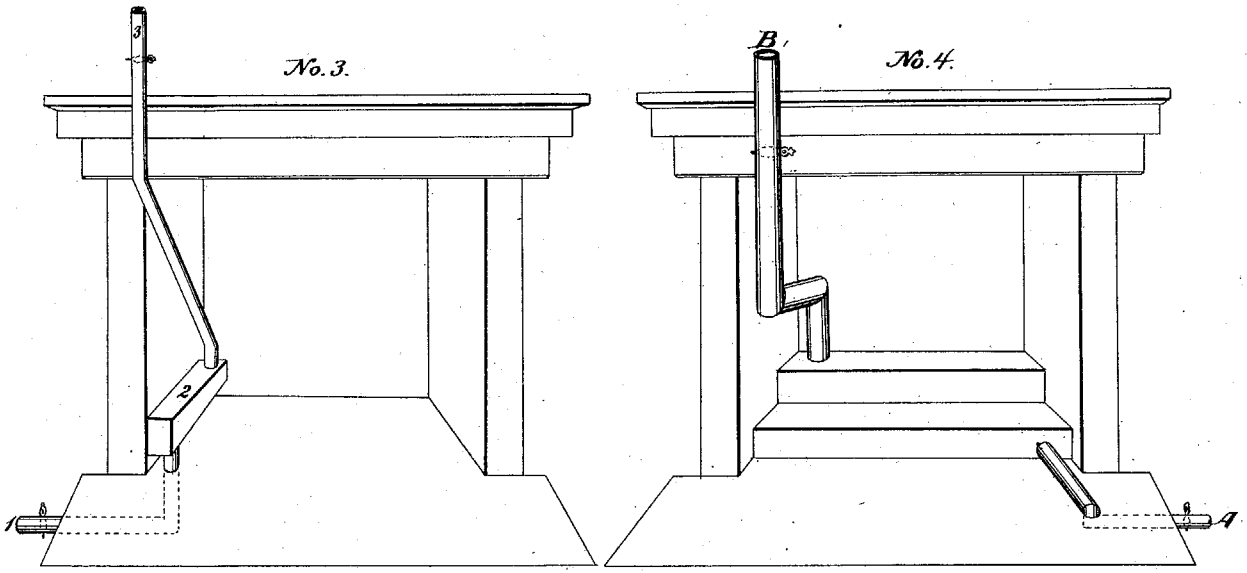

1731X
D. PETTIBONE.
RAREFIED AIR STOVE.
Patented May 12, 1812.
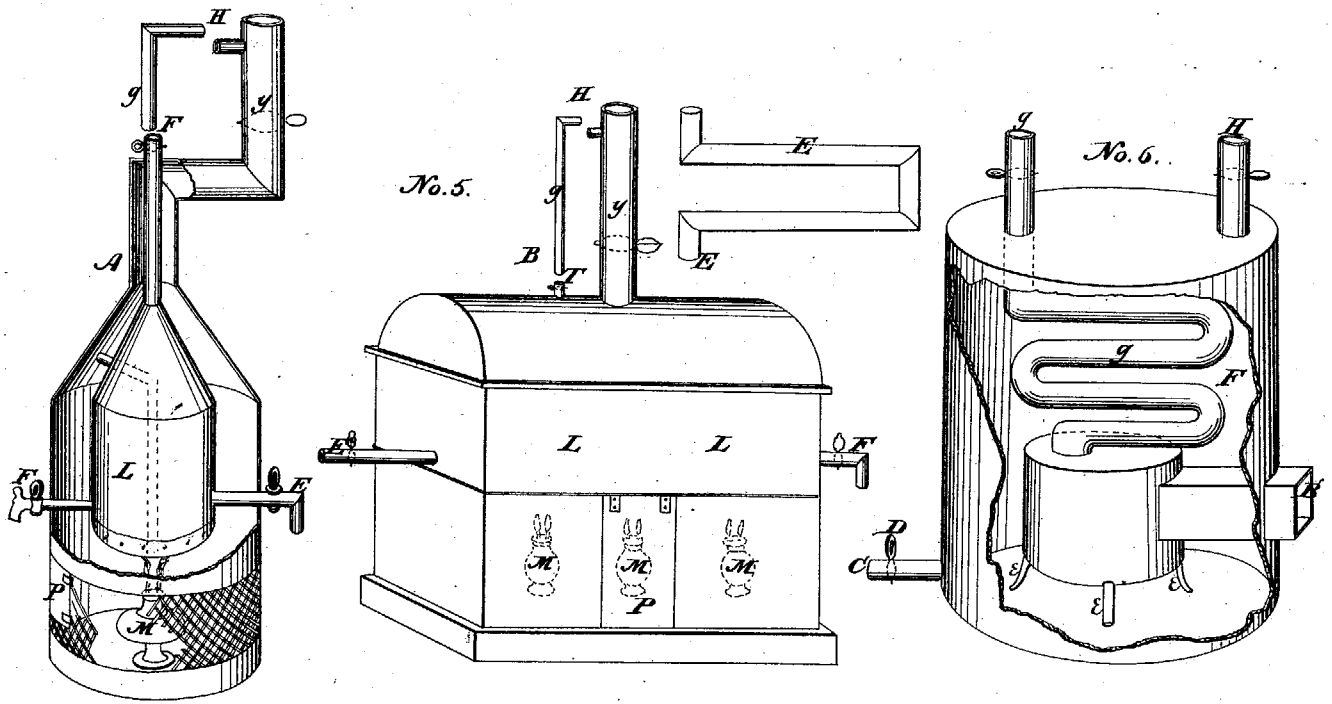

1731X

D. PETTIBONE.

RAREFIED AIR STOVE.

Patented May 12, 1812.

1731X
D. PETTIBONE.
RAREFIED AIR STOVE.
Patented May 12, 1812.
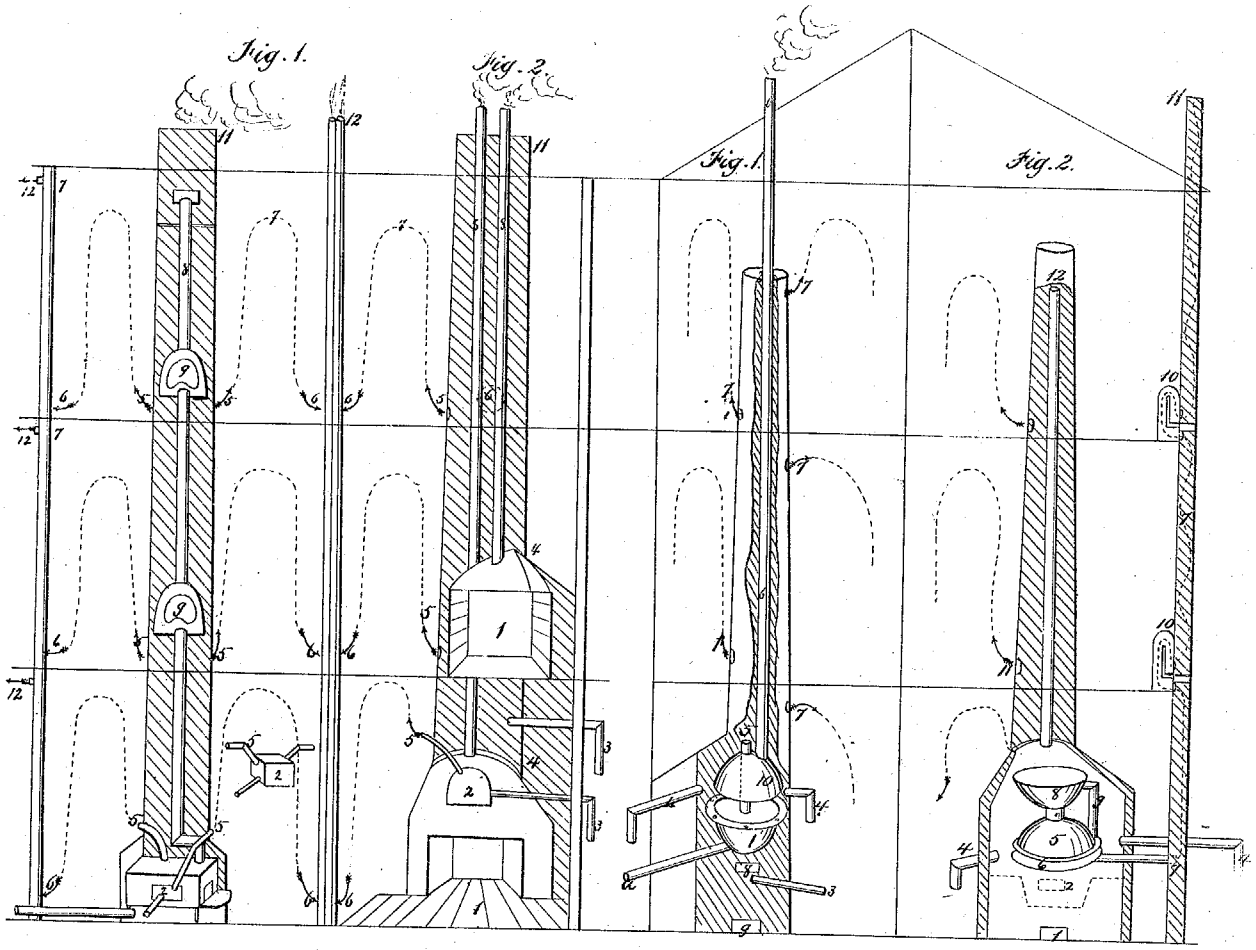

1731X
D. PETTIBONE.
RAREFIED AIR STOVE.
Patented May 12, 1812.
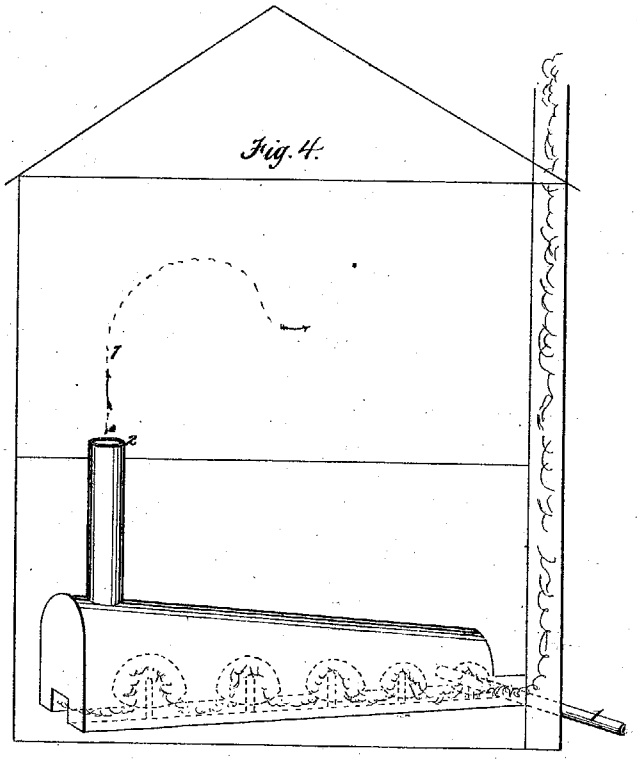
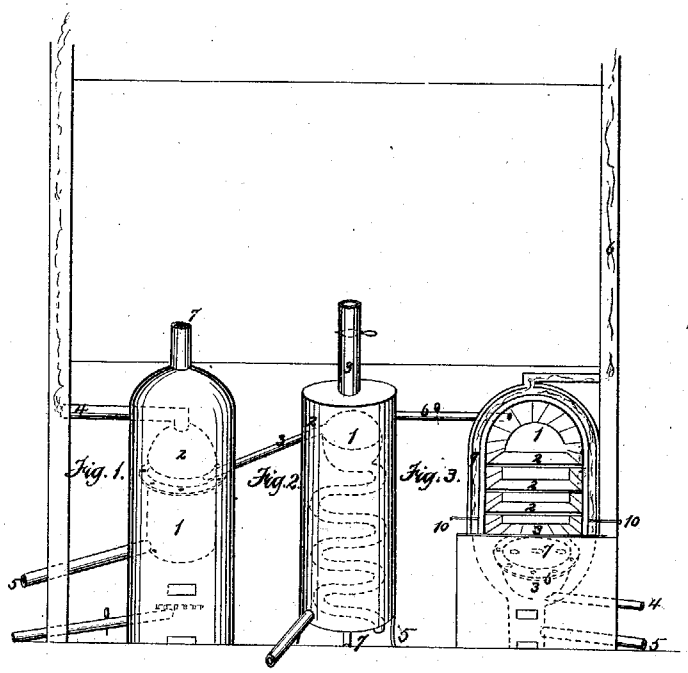

1731X
D. PETTIBONE.
RAREFIED AIR STOVE.
Patented May 12, 1812.
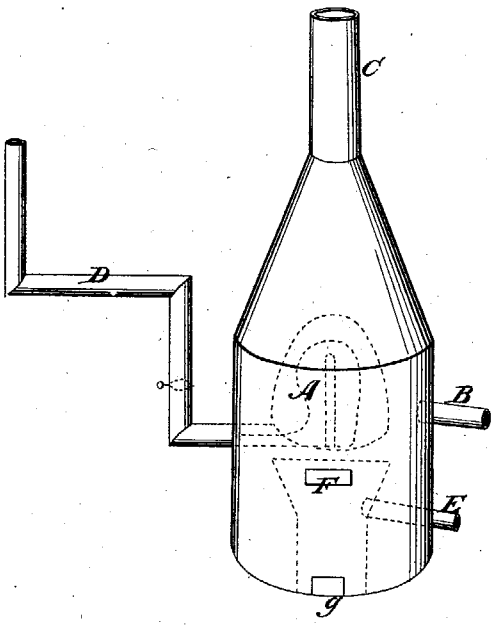
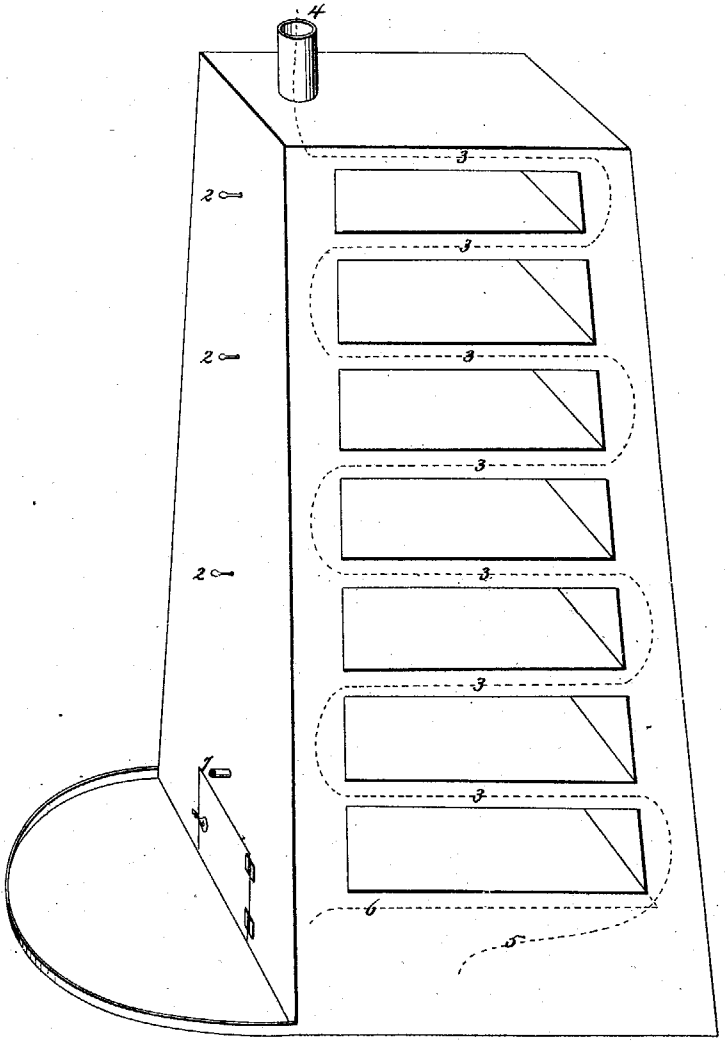

1731X
D. PETTIBONE.
RAREFIED AIR STOVE.
Patented May 12, 1812.
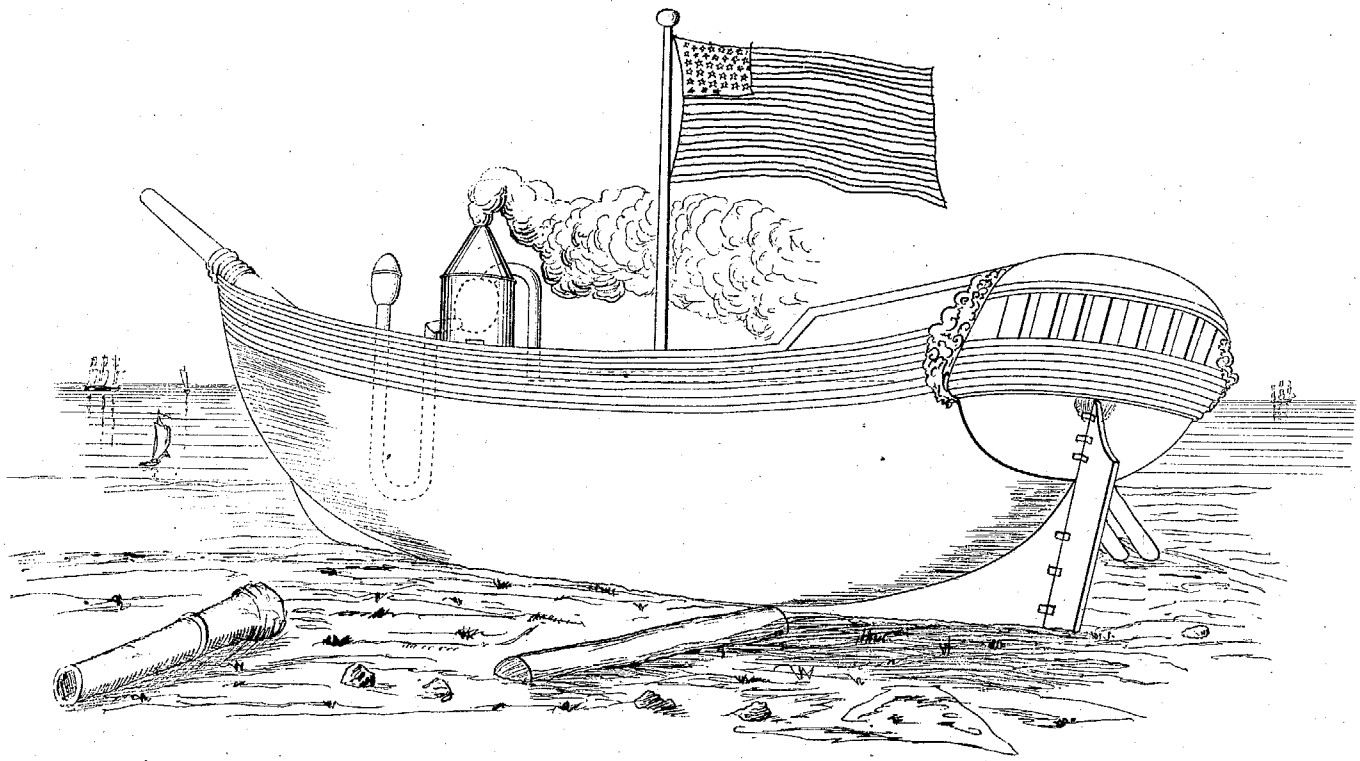

1731X

10 Sheets—Sheet 10.

D. PETTIBONE.

RAREFIED AIR STOVE.

Patented May 12, 1812.

2399

1731X

Daniel Pettibone. — Patented May 12. 1812

To all to whom these presents shall Come, Greeting:
I Certify, That the annexed is a true Copy of a patent gran
to Daniel Pettibone for an improvement in warming room
or apartments by means of rarefied air, applicable to ovens,
drying, hot or green houses rooms &c.

In Faith Whereof, I James Monroe Secretary for th
Department of State of the United States of America
have signed these presents, and caused the seal of my
Office to be affixed hereto, at the City of Washington the
twenty eighth day of April A. D. 1813 and in the
thirty seventh year of the Independence of the said St Jas. Monroe (Patented May 12, 1812)

The Schedule referred to in these letters patent and ma[illegible]
part of the same containing a description in the words of th
said Daniel Pettibone himself of his improvements for war
ing Rooms or apartments by means of rarefied air. appl
cable to ovens drying, Hot or green-Houses, rooms &c.
These improvements of the rarefying air stove, or the inventi
of the same consists in the construction of a stove or fire-pl
with a large rarefying air vessel or chamber connected with
the same, or things as hereinafter described. — These air
vessels or chambers, are so constructed, as to contain any kind
of stove, or Steam pipe or an air-vessel is placed in any Sto
so that the air is heated in contact with the outside of the stov
or steam pipe, or within the stove in the air vessel.
The invention further consists in applying to use (as air
vessels) any pot, kettle, boiler, tube, pipe, cylinder, or other
apparatus for heating air the same as may be used for hea
ing of water &c. These pots, kettles, or boilers may be set in
an iron case with a hoop of three or four inches in widt
soldered or riveted to the sides near the bottom, or in a

118

1731X double walls of bricks, similar to a still or boiler receiving
into them at or near the bottom a large supply of pure, fresh
external atmospheric air from the street, cellar, or yard
by means of one or more tubes or pipes to conduct or con-
vey the external air into the pot stove or boiler & from the
hot stove or boiler into the room or rooms to be warmed,
or into a cistern or reservoir, which may be lined with
pulverized charcoal to prevent the escape of heat thro'
its sides, charcoal being a bad conductor of heat, . . . . .
the heat may be conveyd in tin, paste=board sheet iron
or clay pipes, to any room or apartment. And more effectually
to preserve or economize the heat, the pipes may also be coated
with Charcoal, or made double, so as to have a dead column
of air between, or be covered with several thicknesses of woolen
cloth. All these pipes or tubes must have stop cocks, so as
to regulate the passage of heat at pleasure. Hence this kind
of stove may be so constructed as to produce heat sufficient
to warm fifty rooms in a dwelling House or Hospital &c &c.
or after the heat is conveyed to the grand depot or cistern,
it may be ~~may~~ be drawn off by pipes, in a similar manner
as a city is supplied with water from a fountain, and
conducted to any room or apartment, as wanted. It is
to be observed, that rooms or apartments to be warmed
should be ventilated at or near the floor. Small open fire
fire places or tubes, leading from the floor to the top of
the building, will answer very well. These ventilating
tubes or fire-places should be so fitted with Registers or valves
as to regulate the ventilation, as circumstances may requi
When it is found that the external air is warm and
the apartment is crowded with people, it is proper that
ventilation should take place at the top, at or near
the ceiling. Whenever an apartment is fitted with con-

1731X taminated air, particularly in the summer by the perspiration
or breath of a crowded assembly, or from the burning of candles
or lamps, or from any other cause, it is of much consequence that
double tin plate ~~board~~ or other tubes (filled between with char-
coal) should be placed just above the lights, and carried into the
external atmosphere by blue-ing one or more of Argand patent
lamps in or near the end of the tubes. The air in the tubes
becomes rarefied, and by the current of air up the tubes the
ventilation is made to be more complete.

There may be many dispositions of this principle of ~~this~~
~~principle~~ and the Modifications of the apparatus innumerable
The common chimney or open fire-place, also the common
open stove (called the franklin fire place) is very much im-
proved, by placing an air vessel upon it, and sometimes a
hollow cylinder in place of a back log in it, or just above the
fire. The flame & smoke by passing round the air vessel
in a reverberatory manner, communicates their heat to
the air in the air-vessel which air is introduced into the
air vessel from the exterior atmosphere, as before described
and let into the room, or to an adjoining room from the
sides or top of the stove. The air vessel in the common chim-
ney fire-place, I place just above the fire or the hind back fi
near the mantle (if it is low) and then admit the warm
air into the room just above the mantle tree. Considering
the upright heat directly over the fire, to be much the
greatest except in contact with or in the midst of the
kindled coals. Therefore I have constructed, upon a more
cheap and improved plan, a metallic box (being an air
vessel) composed of tin sheet or cast iron plates. This box
must be adapted to the shape of the chimney or rather fire
place and so closely fitted to the back and jambs as to pre-
vent the escape of the heat & smoke except next the mantle,
where room sufficient must be left as a draft for the

1731X smoke. It may be necessary to have several boxes, one above the other, connected with <u>short tubes or pipes</u>. The external air entering the lower box and issuing from the uppermost by pipes into the room under or above the mantle, through a plate of iron or marble &c. If only one box is applied in the chimney, it is best to have the upper part double, having a dead column of air (being a non conductor) to prevent the escape of heat. — If these boxes are made of tin plates, they should be painted black, to prevent the escape of heat by reflection. In fitting these boxes, dampers or registers may be used, to prevent too great a draft or ventilation — and they might be of further useful if the chimney should happen to be on fire to prevent a part, or all the current from descending — By which means the fire would be immediately extinguished.

In some instances . . . I have caused air pipes to pass directly through the fire perpendicularly or horizontally, among the kindled coals or just above them. — I have made grates with hollow bars, for the purpose of heating either air or water.

A hollow cylinder, of six or eight inches diameter, made of the stoutest sheet-iron, or made of cast iron used in place of a back-log would answer better; the external air entering at one end, or at any other part of the cylinder would pass into the air vessel above the fire, or immediately into the room, or rooms or to an adjoining room or room[s]. At times, I introduce water into these grates or cylinder[s] the steam of which I apply by means of pipes to many useful purposes. Such as heating air in tubs or casks in contact with the steam pipes or procuring warm baths in chambers &c. In all cases where there are open fire places the inlet of warm air should be in some proportion to that which is drawn out, to prevent the cold

1731X air rushing in at the doors, windows, crevices &c.

Further improvement on the common chimney and open fire-place viz: after adding the old invention of a hollow hearth, back and jambs of iron published in Paris in the year 1709, or a proper open stove, or fire-place of cast-iron purposely fashioned or fitted — I arch over or construct the flue with iron plates just within the Mantle-piece, including an iron or clay pipe, which pipe must pass up the chimney flue to the top or nearly so to conduct off the smoke. The chimney must be stopped up at or near the top by arching with bricks so as to leave the aperture for the ~~sm~~ smoke-pipe free.

This may be swept from the top or from an opening in the chimney in the garret above a brush scraper and weight attached to a cord, and this opening in the chimney may be closed with an iron door — The external air being admitted through a hole of six, eight or more inches in diameter under the hearth rises in contact with the outside of the heated iron pipes — And may be transmitted through some holes in the chimney, in the different apartments and regulated at pleasure with valves or registers. It is to be observed, that an apartment can very soon be cooled or ventilated by making a hole in the chimney flue near the ceiling and by unstopping the chimney flue where it had been ceiled and stopping the external air hole at the bottom under the hearth. By this means, the contaminated or foul air of a room will be drawn out of it, up of the flue of the chimney — Therefore a fire in a lower most room will serve to cool or ventilate the upper or middle rooms in the summer, if fixed according to the above improvement.

I contemplate to build chimnies with only one flue either oval round or square — commencing at the first

1731X floor, without any divisions, sufficiently large to admit as
many iron or clay pipes as there may be fire places, grates
or stoves in the different stories as required in the common mode of bu
ing chimnies. In those cases where the fire-place is erected without
hollow backs, jambs, or hearths, the flue of the chimney must be closed
just above the mantle piece so as to include an iron pipe or funn
as before described, to convey the smoak (the chimney being sealed
above, as before mentioned). And to this pipe one or more air-p
may be constructed, which serve to retain an additional quantity
heat from the fuel. In this constructed fire-place, the external
air must be admitted into the chimney flue, just above the en-
closure near the mantle-piece to which may be adapted a damp
or register: and the chimney flue is furnished with issue holes
to allow the heated air to pass out into the different apartments It is of consequence to place pieces of iron pipe or funnel, in th
chimney flue, especially opposite the lower or middle rooms, the
inner ends of which spread wide, to catch the current of the heated
air in its ascension within the flue.

I have constructed an apparatus, so as to convey the external air
through the medium of tubes, or portable hollow backs or hearths
terminating in several holes (supplied with dampers) so that
the air may enter among the coals, placed in a fire-place grate o
stove, and blow them in a similar manner to a smith's forge
Hence this is called the external blower.

Further. One or a number of common iron kettles may b
placed, inverted, on a furnace erected for that purpose, over
which an arch may be made with bricks, or a funnel made
sheet iron, tin plate double, or a wooden frame, properly lathe
and plastered, (which is far better than bricks, if a suitable
[illegible] from the heated iron) this arch or funnel is suspe
so far above; as to have a sufficient space between the conv
part of the kettle and the concave part of the arch or funn
so as to admit a sufficient portion of external air, by means of a large tubes or openings, near the bottom, the kettles may be placed on a line, or in a cluster of three or four together.

The fire is then applied, and the air is heated on the external sides of these kettles and when heated it passes up in one large tube, or trough several pipes introduced into the concave part of the upper part of the funnel or allow the heated external air to escape into the apartment to be warmed, while the smoak is conducted off in a reverberatory manner, under the kettles, and then up through an iron pipe in the Center or through funnels or flues of bricks made as in ordinary. ~~~~

I apply to use all kinds of stoves, or things, that give heat from fuel in combustion free from smoak, whether it be globular semi-globular, square or cylindrical and heat the external air in an air vessel inside of the stove, or in contact with the out side. I have found it of consequence to place the kettles or Stove outside of a building, or under neath — and expose the stove to the open air, as if it stood in the open field.

When I suspend a funnel over the kettles or stove resembling a common tin funnel such as is used for filling of bottles except that it is made double or treble, allowing the air to pass up between into the main pipe that enters the upper part of the apartment to be warmed, which main pipe is to be opened or constructed according as the heat escapes from the stove or kettle so so.

As an additional evidence of the utility as this principle, and of my improvement nearly all the heat generated from the combustion of the fuel used, may be saved and transmitted at pleasure by Fifty more or less, cast or cast tubes or boxes either cylindrical, and square, or flat, placed one above the other (somewhat similar to the worm of a common Still in its effect) in the bricks or iron wood — on grating resembling net work, sufficient to hold plaster mortar or cement instead of Bricks by which I form a kind of oven or reservoir of heat, by enclosing the tubes or boxes in it.

1731X

In these flat smoke boxes (as I beg leave to term them) I place a
division plate, standing edge wise, which causes the Smoke
to pass twice across the oven in each box, before it rises into
the next:

+ These tubes or boxes are open at one or both ends at places
when the soot is to be taken out. The apertures for the removal
of the soot appear through the bricks iron &c. Underneath these
tubes or boxes I frequently apply a stove very much like the
common one:— known by the name of the nine or ten plate
stove or oven Stove— In this common Stove, two plates only are
exposed to the upright flame, the one under the oven & the
other at the top. It often happens that the center plate called
the oven-plate, is too hot, which generally burns the bread, &
To prevent this, bricks are often used in the oven— Another
circumstance, very disagreeable, is, that the fumes of the oven
are admitted into the room and occasions the air in the room
to be very unpleasant and unfit for respiration.

To remedy this inconvenience, I have made the following
improvements. The oven plate is a cast iron grating or
net work sufficient to hold clay, mortar, cement, or plaster
which holds the heat similar to a common brick oven; the
heat being gentle and regular, prevents the articles from burning
that are put upon it.

I sometimes make the oven plate of two thin plates of
wrought or sheet iron, with an inter medium of clay or
mortar, instead of net work iron plates, as common, or iron [The outside of the stove I make of cast—]
net work and plaster. I cause the flame to pass through the
oven in a sheet or cast iron tube or flue, which is in size
about four inches by eight, or so as to be two or three inches nar-
rower than the body of the stove.

The advantage of this tube passing through the oven is
that more heat is retained, so as to bake the upper part of the [illegible]
as well as the bottom.

1731X

3<sup></sup>d Ventilation in the oven is of importance. It not only adds
to the flavor of the articles baked or cooked, but tends to expedite
the processs. In order to perform this operation, a cast [illegible]
wrought iron pipe or tube of the size of a gun barrel should
be placed in the hottest part of the stove under the oven plate,
and one end connected with the air of the room, or the external
air, which is preferable. The other end is to enter the oven
through the oven plate at the back end of the plate or oven.
then is to rise nearly to the top. — I have then another pipe
leading downward from the under side of the smoak tube
or flue, within the oven near the oven plate. In this oven, as the
hot air from without enters the top of the oven, it forces
the fumes downwards to enter the pipe that leads into
the smoak flue. Dampers or registers are fitted in the pipes
to regulate the current of air going in or out of the oven, to
ventilate it more or lefs.

4thly. When this stove is enlarged with a number of flues
or smoak boxes, one above another, It is intended for bakeing
of meat, bread, pastry, drying fruit &c. Openings are made
in the side, to admit iron drawers furnished with wire
net work bottoms; sheet iron however with perforations,
may answer the same purpose. These drawers are
intended to slide in between the boxes or flues to rest upon
them — which in fact appears like a case of Drawers. When
this stove, oven, or apparatus, is used for warming rooms,
a large supply of external air is admitted, which comes in
contact with heated stove, boxes, and flues.

When it is used for cooking, bakeing drying fruit &c. a
current of air is employed, as before described.

The fire in the stove should be blown with external air,
as should be the case with all stoves at times. — By external
air, I mean air from without the house. A strong current
of air, if it enters thirdly under the burning fuel, will

1731X cause the smoak to go in any direction, either direct to the
top of the stove or to descend in all the winding passages,
like the steam in the worm pipe of a common Still. It
will then ascend in a pipe or the Chimney flue.
6 I very much improve the common baking stove already
in use by altering it to an air stove; or by cutting a hole
in the plate above the oven, to discharge the fumes, to which
hole a register is fitted, to let off more or less as circumstances
may require.
7. A Stove or apparatus of any proper size of the semi-
circular or any other convenient form, with a proper fire pl[illegible]
under it, enclosed in bricks forming a double wall, in a
similar manner as employed for warming Rooms, may be
used for ovens, or drying house &c.&c. These Ovens, or drying
rooms may be made of any size and materials, according
to the different degrees of heat required. [illegible] only for drying
of Cloaths paper &c furniture &c. A room made of wood or
partly lathed and plastered inside, and a wall of bricks at
two or three inches distance outside, will answer. — It also
will be found to answer exceedingly well for a clothier [illegible]
washing room &c. as it will perform the operation requi[illegible]
[illegible] much sooner than the rays of the Sun. And can be
appropriated to great advantage in drying barley, malt
corn, meal, flour or fruit with less danger and expense
than the common mode of kiln drying.
8 ~~[illegible]~~ When the oven is intended for drying japanned
or varnished ware, or for any kind of cooking, it must
be made arched at the top with bricks &c. cast or sheet iron
or tin plates double at the top, sides, filled between with
[illegible] [illegible] finely pulverized. It should be supplied with
shelves of tiles, [illegible] or wire net work.

Ovens may be made of various forms and shapes. And when
the oven is made a semicircle form — One or more iron which (with an iron net work or wire, or other suitable substance for the articles to lay on) may be placed in it horizontally on an upright shaft which wheel, or wheels pass through the stove or oven, on one part of which unbaked bread or other wh such as seeds of all kinds for the purpose of drying or com may be placed, and by turning the wheel round the artic are carried through the heated air in the oven or stove and come out baked on the other side. These wheels may be moved by weights as a clock or by the hand.

I do at pleasure introduce into the oven stove or drying room hot air steam, or cold air as circumstances may require and regulate the same by stop cocks, registers, or dampers – These different airs being all fresh, completely ventilates the air in the drying room &c and carries off all kinds of vapour into the smoke flue, or by pipes into the open air.

X

Further to Econom- ize Fuel. For warming rooms, the following method is proposed. A close stove or common open fire-place, made of cast-iron bricks, stone, or other suitable materials, above which is constructed one two or more plain square flues, of iron or of bricks, or of both, rising to any proportionable height, say four to five feet – The one flue to receive into it the external air and the other for the smoke, all the flues are securely closed at the top. The smoke at the top enters an iron pipe or the chimney flue in which pipe a register or damper is placed and the smoke is conveyed off as in the common stove, or may be made to descend in another flue (which must be added) and rise again to the top ... [illegible] it then escapes. In these smoke flues are placed short pieces of square or round tubes or pipes made of sheet or cast iron, tin or clay. If of clay they are most conveniently made round by the potter's wheel, & burnt as another wave. These pipes or tubes pass across the
smoke flue into the air flue, one above the other at short
distances, and although they are not placed directly over
each other, yet they are situated first on one side & then
the other, closing about two thirds of the flue. Each causes
the flame to ascend and descend in a zig zag manner.
This heat is admitted [into the apartment by a current of warm air] from each tube or pipe. The tubes
or pipes are smallest at the end next the air flue and are
taken out when the soot is to be removed from the flue.
This stove is best not to be immediately connected with the
brick walls of a house, as the wall may have a tendency to
absorb too much of the heat. Furthermore I improve
the common chimney fire-place by turning the flame & smoke
from its usual course into the room within an iron flue,
which flue rises nearly to the ceiling, then enters into the
chimney flue. Which iron flue is at the lower end next
to the fire place about 18 inches wide, and at the upper end
next to the ceiling about six inches, & in depth only three or
four inches. However the shape may be varied as fancy shall
direct. — These Stoves may be made to represent a Pyramid,
Pedestal, or Pillar. Or may be formed to any other shape
for the purpose of ornament & utility. — My Stove or rather
a reservoir of heat may be made to represent a Column
In the center of which a pipe or flue is placed. The smoke
is made to pass round the flue from the bottom to the
top in a spiral or serpentine direction, which is done
by means of bricks so formed as to convey the smoke
in this way. The Stove or column is furnished with
tubes or boxes as before described. When the smoke
has risen to the top of the column, it is carried off in
the common stove, Or may be made to turn down thro
the center of the air flue. — In this stove or reservoir
no appearance of pipes or flues for the smoke is seen 1731X 10 as in other stoves; on the contrary it may be so decorated as to render it an ornament to a Room.

I have constructed a cylindrical stove standing perpendicularly or horizontally, when made perpendicularly it resembles a common Coffee pot, excepting that it has two spouts & no handle, these spouts being opposite to each other, serve as reservoirs or places to put in the fuel, without disturbing the fire as in the common stove.

When lying horizontally the fuel is put in at one end or at the side, similar to a common air furnace (into the inner or outer cylinder It being composed of two cylinders) And the air being heated in the inner or between the two cylinders, And suffered to escape at the top of the outer cylinder.

The application of the following plan is manifestly advantageous in warming and ventilating merchant ships and vessels of war. Viz. A boiler or an air vessel may be fixed in the furnace or fire-place in the Camboose, to the bottom of the boiler a tube is introduced, which passes from it down the inside of the ship or vessel nearly to the keel, where it forms a curve & returns again above the deck— At this place it admits the external air which passes through the tube into the boiler, & after it is heated it passes out of another tube inserted into the uppermost of the air vessel, and the heated air may then be conducted into any part of the ship or vessel. These tubes must be made double, and the intermediate space between the tubes should be filled with pulverized charcoal to prevent the escape of heat where it is not wanted. Also if the receiving tube penetrates into the hold of the Ship, and conducts it into the boiler, and after being heated there, into another tube fixed into the superior part of the boiler, which conveys it into the atmosphere above the deck, where it mixes with the general
This improvement can be very beneficially applied to
of family houses
ventilate mines, hulls, school rooms, and any apart
ment or place impregnated with foul air. To effect this w
out warming the room, the boiler or stove should be
placed above it. But to warm as well as to ventilate it
should be placed below. In some places I apply steam
for warming & ventilating appartments, & particular
where the utmost safety is required, such as Gun powder
factories &c. But instead of steam-pipes being placed
in that apartment the heat is emitted into them by
current of external air, which air has been previo
heated in contact with steam pipes, tubes or worms
other apparatus — I apply boilers or things of various form
to create steam (supplied with safety valves) grates with hol
bars, or one or more hollow cylinders, to pass water thro
the fire, not only to prevent the grates or apparatus fro
being destroyed by the fire but also to create steam, or hea
water for the purposes of warming air.

I claim no particular improvement in heating wa
by steam passing in a worm or other pipe in the tub o
I only say that the transporting of heat to appartmen
to be warmed by a current of fresh air heated by ho
water, or steam is what I claim. A boiler & worm pi
something similar to a common Still, but rever
that is to say instead of applying steam into the up
end of the worm-pipe, the worm pipe being there
so that the steam enters into it at the bottom. The
tom of the condensing tub is upward, which en
the worm-pipe as the steam rises from the boiler t
top of the worm pipe being closed so that it cannot esc
the steam is condensed with a current of cold air
entering in contact with the steam pipe — Which air w heated rises through pipes to the apartments to be warmed, through
the bottom of the containing tub.

In all cases as the steam is condensed to water it returns back
to the boiler, so that there is little or no waste of water from the
boiler. Instead of a worm pipe, a pipe passing in a zig zag
manner within a tub cask or box, or one globe, box, pipe, or
cylinder placed within another either the steam entering the
external Globe or Cylinder &c. & warming air in the exterior
globe or Cylinder, or the steam entering the internal, and heating
the air between the two. Further I apply tubs, casks, or boxes of
any suitable size, into which tubs, casks or boxes I force steam
or hot water, and through these tubs, casks, or boxes, I pass
pipes or tubes of tin, or made of other proper substance
either perpendicularly or horizontally, at one end of these
pipes or tubes the cold external air enters and by passing
through the pipes or tubes within the hot water or steam,
it becomes heated and (as before mentioned) rises by means
of pipes to the appartment to be warmed.

In this mode twenty or more apartments in one House
can be warmed one or all at the same time by opening
& shutting cocks or valves &c.

Portable drying rooms or ovens, constructed on this
plan might be used for drying wet gun powder and wet
cartriges in the army and prevent many disasters that
might result therefrom.

Witness
Geo. Lyon
Rufus W. Adams

Daniel Pettibone

[illegible]

Exd. W.G.

(5532 words)